(12) United States Patent
Gan et al.

(10) Patent No.: US 7,116,015 B2
(45) Date of Patent: Oct. 3, 2006

(54) SYSTEM AND METHOD FOR DYNAMICALLY CONFIGURING AN INFORMATION HANDLING SYSTEM

(75) Inventors: Jyeh Jin Gan, Georgetown, TX (US); David A. Locklear, Knoxville, TN (US)

(73) Assignee: Dell Products L.P., Round Rock, TX (US)

( * ) Notice: Subject to any disclaimer, the term of this patent is extended or adjusted under 35 U.S.C. 154(b) by 605 days.

(21) Appl. No.: 10/349,608

(22) Filed: Jan. 23, 2003

(65) Prior Publication Data

US 2004/0145244 A1    Jul. 29, 2004

(51) Int. Cl.
*H01H 35/00* (2006.01)

(52) U.S. Cl. .................................................. 307/116
(58) Field of Classification Search ................. 307/116
See application file for complete search history.

(56) References Cited

U.S. PATENT DOCUMENTS

| | | | |
|---|---|---|---|
| 4,656,626 A | 4/1987 | Yudichak et al. | 370/68 |
| 5,338,979 A | 8/1994 | Mammano et al. | 307/443 |
| 5,382,841 A | 1/1995 | Feldbaumer | 326/30 |
| 5,495,584 A | 2/1996 | Holman, Jr. et al. | 395/308 |
| 5,528,167 A | 6/1996 | Samela et al. | 326/30 |
| 5,536,176 A | 7/1996 | Borchew et al. | 439/61 |
| 5,734,208 A | 3/1998 | Jones | 307/139 |
| 5,961,619 A | 10/1999 | Voloshin | 710/101 |
| 5,983,296 A | 11/1999 | Lamkin et al. | 710/100 |
| 6,112,271 A | 8/2000 | Lanus et al. | 710/128 |
| 2004/0225816 A1* | 11/2004 | Leigh et al. | 710/305 |

* cited by examiner

*Primary Examiner*—Brian Sircus
*Assistant Examiner*—Dru Parries
(74) *Attorney, Agent, or Firm*—Baker Botts L.L.P.

(57) ABSTRACT

A system and method for dynamically configuring an information handling system includes a configurable backplane having one or more connectors, at least one switch, one or more terminations, and at least one sense engine. The switch includes an open state and a closed state while the terminations include an active state and an inactive state. The sense engine interfaces with the connectors, the switch, and the terminations and detects peripheral attachments to the connectors. Based on the detection information, the sense engine determines if the switch should be in the open or closed state and determines whether each termination should be in the active or inactive state. The sense engine alters the switch setting and the termination states.

16 Claims, 2 Drawing Sheets

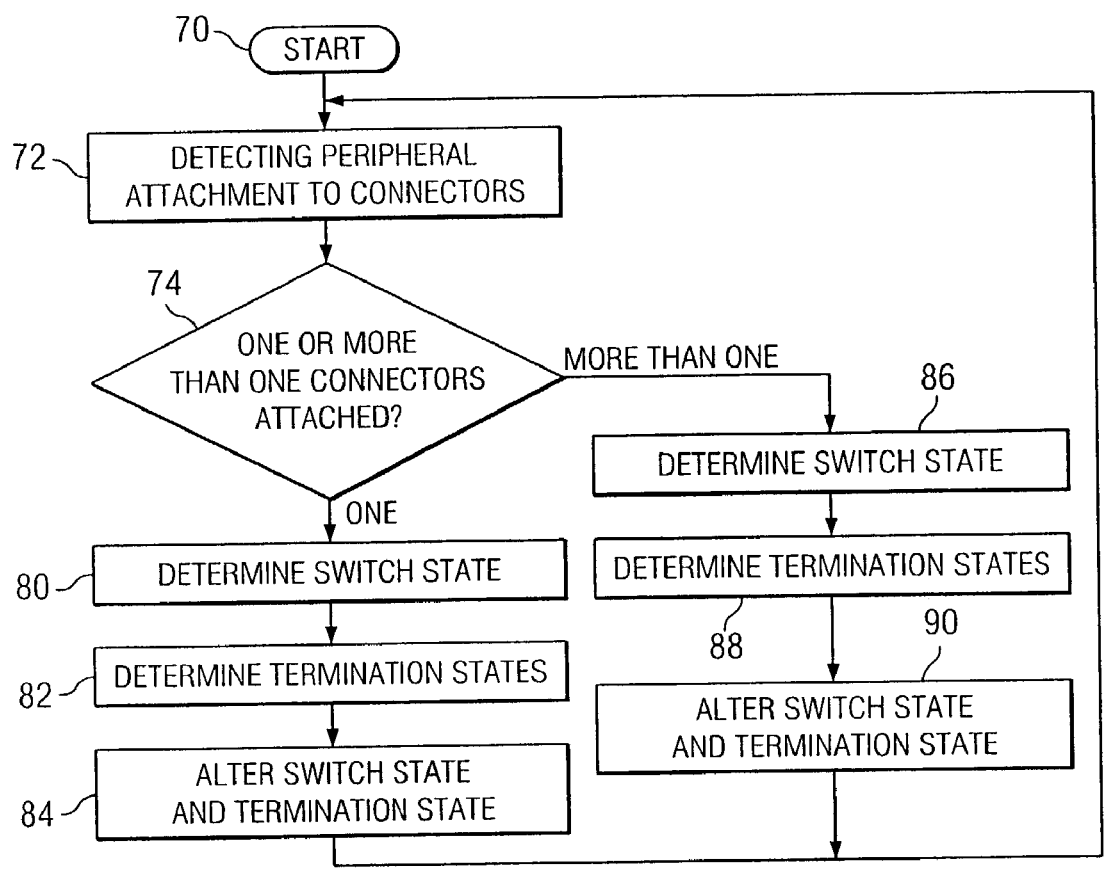

SYSTEM AND METHOD FOR DYNAMICALLY CONFIGURING AN INFORMATION HANDLING SYSTEM

TECHNICAL FIELD

This disclosure relates in general to the field of information handling systems, and more particularly to a system and method for dynamically configuring an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems become more complex due to increasing operating demands, it is important for such systems to allow for user flexibility while maintaining high levels of operation and performance. One option manufacturers offer to satisfy consumer needs are information handling systems that include one or more configurable components. The configurable components allow consumers to use the system in one or more different modes of operation. The configurable components allow consumers to change the operation of their systems without having to buy a new system. Consumers desire the configurable components because it provides greater flexibility in performing tasks with the information handling system.

One example of a configurable component is a backplane or motherboard such as a Small Computer System Interface (SCSI) backplane. A reconfigurable backplane can be used by the consumer in a split mode or a non-split mode. In the non-split mode, the backplane has a single SCSI bus route. One controller, such as a Redundant Array of Independent Disks (RAID) controller, manages all of the hard disk drives interfaced with the backplane. However, some consumers may prefer a split backplane in order to optimize all the resources of the information handling system. Many management functions require a particular number of drives. For example, RAID 5 requires three hard disk drives. Therefore if a function uses only three of the eight hard disk drives interfaced with the backplane, it would be useful to utilize the other five drives. Therefore, a user may prefer to configure the backplane in a split mode including two SCSI bus routes and two RAID controllers managing the hard disk drives. Having two controllers allows for the drives associated with the backplane to be used for different functions. Therefore, a configurable backplane allows for flexible and efficient use of the information handling system.

Despite the flexibility of information handling systems having reconfigurable components such as a backplane, these systems typically suffer from problems due to the configurability. For instance, configurable backplanes experience problems with stubs and the placement of external connectors. Stubs are bus route dead ends and generally occur due to the placement of one or more passive terminations at the end of the bus route. The passive terminations do not allow for a single, uninterrupted bus route in different configurations of operation. Therefore, reconfigurable systems must be designed to have more than one bus route with the bus routes present in more than one modes of operation, but only intended for use in one mode of operation. Therefore, in one or more modes of operation the bus route serves no function and leads to an unnecessary bus route dead end or stub. The stubs typically have a detrimental effect on signal integrity by limiting the bus frequency and potentially resulting in corruption of data. When a signal encounters a stub, the signal travels along both the stub and the intended bus route. Because the signal travels along both routes, the signal strength decreases resulting in potential degenerate system performance. Furthermore, the stub generally causes reflections in the signal because the signal bounces back after hitting the dead end of the stub. This reflection may further add to the data corruption. And as information handling system operations increase in speed, these reflections magnify causing further data corruption.

Information handling systems including reconfigurable components such as configurable backplanes also experience problems with the placement of the components on the backplane. For instance, a configurable backplane having two modes of operation requires two connectors for two controllers to access the backplane when operating in a split mode. The two connectors are typically not located together on the backplane and are generally not located on an edge of the backplane for easy accessibility. It is difficult to move the passive terminations thereby requiring the second bus route to enter the backplane from a new route located on a side different than the first bus route. Having the connectors on two different sides of the backplane creates problems with manufacturability and serviceability.

SUMMARY

Therefore, a need has arisen for a system and method for dynamically configuring an information handling system including reconfigurable components that eliminates stubs in the system.

A further need has arisen for a system and method for dynamically configuring an information handling system including reconfigurable components that enables more than one connector to be located on the same edge of the backplane.

In accordance with the teachings of the present disclosure, a system and method for dynamically configuring an information handling system are described which substantially eliminate or reduce disadvantages with previous systems and methods for reconfiguring information handling systems. A plurality of dynamically enabling and disabling terminations allow for the movement of terminations on a backplane which results in the elimination of stubs and allows for more than one connector to be placed on the same edge of the backplane.

In accordance with one aspect of the present disclosure, an information handling system is provided. The information handling system includes a backplane. The backplane includes one or more connectors that connect to one or more peripheral attachments. The backplane also includes at least one switch that has an open state and a closed state. In the open state, the switch has the effect of disconnecting two bus segments. In the closed state, the switch has the effect of connecting two bus segments via a very low impedance. Associated with the switch are one or more terminations that have an active state and an inactive state. In the active state, the terminations present the proper terminating impedance on the bus. In the inactive state, the terminations present a very high impedance on the bus. The connectors, switch, and terminations interface with at least one sense engine. The sense engine detects if the connectors interface with one or more than one peripheral attachments. Based on the detection information, the sense engine determines a setting for the switch and a state for the terminations.

More specifically, the system includes one or more multi-loop terminations and at least one single-loop termination. If the sense engine detects that the connectors attach to more than one peripheral attachment, the sense engine sets the switch to an open setting, the multi-loop terminations to an active state, and the single-loop termination to an inactive state. If the sense engine detects that a connector attaches with one peripheral attachment, the sense engine sets the switch to a closed setting, the multi-loop terminations to an inactive state, and the single-loop termination to an active state.

In another embodiment, a method for dynamically configuring an information handling system includes detecting peripheral attachment for a plurality of connectors. Based on this data, the system determines a setting for one or more switches and one or more terminations and alters the switches' settings and the terminations' settings accordingly.

The present disclosure provides a number of important technical advantages. One important technical advantage is the elimination of the stubs. A dynamically configurable backplane can be used in either the single-loop (non-split) mode or the multi-loop (split) mode of operation without having any unwanted stubs on the bus route. The enabled (active state) and disabled (inactive state) terminations allow the design and layout of the bus routes to run uninterrupted in both modes of operation. Enabled terminations are present at the far end of each bus route as required. Therefore, there are no stubs in the system. The elimination of stubs results in better operating efficiency and less data corruption. It allows for better operating efficiency by reducing the problems with the degeneration of internal signal strength that stubs create. Additionally, the removal of stubs reduces reflections of the signal that leads to data corruption.

Another important technical advantage of the present disclosure is that multiple connectors can be located on the same edge of the backplane. This allows a user to switch between modes of operation in a configurable backplane by accessing only one edge of the backplane, improving serviceability. Also, a backplane can be more easily manufactured because connectors need to be affixed to one edge of the backplane. Because the enabled/disabled terminations allow for bus routes to run through inactive terminations, a second bus route does not have to start on another side of the backplane. Therefore, the design of the bus routes allows for two connectors to be placed on the same edge of the backplane. Having two connectors located on the same side of a backplane allows for better manufacturability and serviceability.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 depicts an example embodiment of a method of dynamically configuring a backplane of an information handling system.

DETAILED DESCRIPTION

Figure 1:
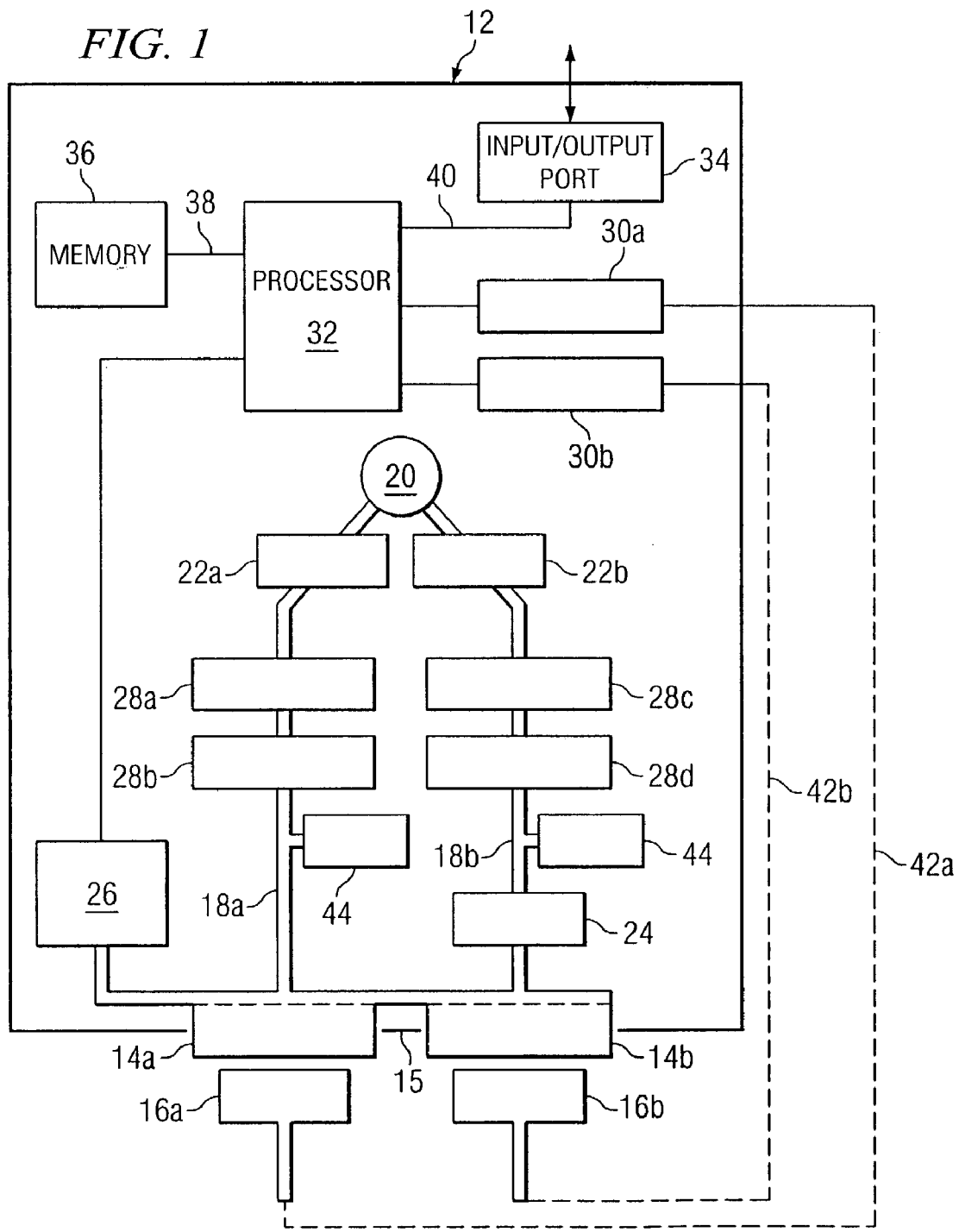
FIG. 1 illustrates an example backplane of a dynamically configurable information handling system.

Preferred embodiments and their advantages are best understood by reference to the figures, wherein like numbers are used to indicate like and corresponding parts.

Previous systems and methods for dynamically configuring information handling systems experience problems with stubs and inconvenient placement of additional external connectors. The present disclosure allows for a system and method for configuring an information handling system that includes terminations that can be in an active or inactive state. These terminations allow a backplane to be designed without unwanted stubs and allow two or more connectors to be placed on the same edge of a backplane.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 illustrates an example backplane 12 disposed within an information handling system. Backplane 12 may be a circuit board, a motherboard, or any other appropriate type of printed board. Furthermore, backplane 12 may also be referred to as an information handling system. As shown in the embodiment of FIG. 1, backplane 12 is a Small Computer System Interface (SCSI) backplane.

In the example embodiment, backplane 12 may further include respective software components and hardware components, such as processor 32, input/output port 34 and memory 36. These components communicate and work together via buses 38 and 40. Backplane 12 may further include expansion cards, memory chips, dip switches, jumper pins, BIOS chips, capacitors, resistors, pin connectors as well as any other appropriate computer hardware. The various hardware and software components may also be referred to as processing resources.

Backplane 12 includes connectors 14a and 14b positioned at edge 15 of backplane 12. FIG. 1 shows an embodiment with two connectors, but alternative embodiments may include more than two or less than two connectors. Connectors 14a and 14b interface with one or more peripheral attachments 16a and 16b. Connectors 14a and 14b may be, but are not limited to, pin connectors or edge connectors. Connectors 14a and 14b are located on edge 15, but in alternative embodiments may be located on any edge of backplane 12. Connectors 14 being located on the same edge of backplane 12 allows for easier accessibility and serviceability by the user of backplane 12 because the user can quickly connect or disconnect components to connectors 14 without having to search backplane 12 for connectors 14.

Peripheral attachments 16a and 16b are operable to interface with connectors 14a or 14b and may further interface with external cables 42a or 42b. Peripheral attachments 16a and 16b may be a cable, a wire, a pin connector, or any appropriate device operable to interface with connectors 14a and 14b. Although FIG. 1 illustrates two peripheral attachments 16a and 16b, alternative embodiments may include more than two or less than two peripheral attachments.

Bus routes 18a and 18b are associated with connectors 14a and 14b. Bus routes 18 serve to link connectors 14a and 14b to switch 20, terminations 22a, 22b and 24, and slots 28a, 28b, 28c, and 28d. Buses 18a and 18b may also be associated with one or more SCSI Access File Tolerant Enclosures (SAF-TE) controllers 44. SAF-TE controllers are intelligent agents on the bus. Buses 18a and 18b provide channels for signals to travel between the devices interfaced with slots 28 on the bus route. Although only buses 18a and 18b are shown, alternative embodiments may include more than two or less than two bus routes. For example, backplane 12 may include three bus routes that may be connected as a single bus route, two bus routes, or three bus routes.

Switch 20 is associated with connectors 14a and 14b through buses 18a and 18b. Although FIG. 1 shows one switch, alternative embodiments may include more than one switch. Switch 20 includes an open state and a closed state. In the open state, switch 20 disconnects buses 18a and 18b allowing for a split configuration and two bus routes. An open switch 20 does not allow a signal to pass between buses 18a and 18b. In the closed state, switch 20 provides a very low impedance path to connect buses 18a and 18b creating a non-split or single bus route including both buses 18a and 18b. Sense engine 26 monitors the presence of peripheral attachments 16a and 16b via connectors 14a and 14b through a plurality of sense lines and uses that information to operate switch 20 and terminations 22a, 22b, and 24 through a plurality of enable lines. In alternative embodiments, switch 20 may also perform the tasks of sense engine 26.

A plurality of terminations 22a, 22b, and 24 are associated with switch 20 through buses 18a and 18b. Terminations 22a, 22b, and 24 include an active state and an inactive state. In the active state, the terminations stop a signal travelling along buses 18a or 18b by providing an appropriate impedance to terminate the signal. For example, when termination 22a is in the active state, a signal originating at peripheral attachment 16a and connector 14a travels through slots 28a and 28b and terminates at termination 22a. The signal does not travel through switch 20, slots 28c and 28d, and terminations 22b and 24. When terminations 22a, 22b, and 24 are inactive, they present a very high impedance and have little to no effect on the signal. For instance, when terminations 22 are inactive, termination 24 active, and switch 20 closed, a signal originating at connector 14a and peripheral attachment 16a travels through slots 28a and 28b, bypasses inactive termination 22a, passes through switch 20, bypasses inactive termination 22b, travels through slots 28c and 28d, and terminates at termination 24. When inactive, terminations 22a, 22b and 24 have a very high impedance on buses 18a and 18b, essentially having the effect of being physically removed from buses 18a and 18b. Because signals on buses 18a and 18b are able to bypass terminations 22a, 22b, and 24 when in the inactive state, multiple connectors, such as connectors 14a and 14b, can be placed on edge 15 of backplane 12. Generally in previous systems and methods, placing the connectors at the edge of the backplane would not be possible because active terminations are required to be placed at the far ends of buses. For example, if termination 24 was permanently active, termination 24 would not allow bus 18b to be accessed from connector 14b since the termination at the near end of the bus would interfere with the signal. Therefore a connector would have to be placed between termination 24 and slot 28d so that a switch could disconnect the bus from termination 24. However, terminations capable of both an active state and an inactive state allow multiple bus routes to enter backplane 12 from just one edge of backplane 12.

Although the embodiment of FIG. 1 shows three terminations, alternative embodiments may include more than three or less than three terminations. Sense engine 26 monitors the active and inactive state of terminations 22a, 22b, and 24 through the sense lines and activates and deactivates terminations 22a, 22b, and 24 by sending a signal to them through the enable lines. Sense engine 26 also monitors the open and close state of switch 20 through a sense line and opens and closes switch 20 by sending a signal to it through the enable line.

Sense engine 26 is associated with the connectors 14a and 14b, switch 20, and terminations 22a, 22b, and 24. Sense engine 26 detects peripheral attachments 16a and 16b to connectors 14a and 14b. Based on the detection data, sense engine 26 determines a state for switch 20 and a state for terminations 22a, 22b, and 24 and then alters the states of switch 20 and terminations 22a, 22b, and 24. Although FIG. 1 illustrates one sense engine, alternative embodiments may include more than one sense engine.

Sense engine 26 performs the detection actions through a variety of methods. In one method, the sense lines and the enable lines may link sense engine 26 to the devices being controlled such as connectors 14a and 14b, terminations 22a, 22b and 24, and switch 20. For connectors 14a and 14b, the sense line detects if connectors 14a and/or 14b interface with peripheral attachment 16a and/or 16b. For switch 20, the sense line detects if it is in an open or closed state. For terminations 22a, 22b and 24, the sense line determines if the termination is in an active or inactive state. Based on this input data from the sense line, sense engine 26 determines a state for each component and keeps or changes the state of each component by sending a signal along an enable line. Sense engine 26 can send a signal along an enable line to open or close switch 20 and activate or deactivate terminations 22a, 22b and 24. Sense engine 26 may be located remotely from backplane 12 or disposed on backplane 12 as shown in the embodiment of FIG. 1. Sense engine 26 may be a CPLD (complex programmable logic device), a programmable integrated circuit, or any other appropriate sensing device. In another embodiment, sense engine 26 is included in switch 20.

Backplane 12 may further include one or more slots 28a, 28b, 28c and 28d associated with connectors 14a and 14b through buses 18a and 18b. In alternative embodiments, backplane 12 may have more than four or less than four slots. Slots 28a, 28b, 28c and 28d further interface with one or more devices. The devices may include hard disk drives, memory cards, expansion boards, microprocessors, video cards, or any other appropriate computing component.

Backplane 12 may include one or more management engines 30a and 30b. Management engines 30a and 30b are associated with connectors 14a and 14b through peripheral attachments 16a, 16b, and external cables 42a and 42b. Management engines 30a and 30b are operable to communicate and control the devices interfaced with slots 28a, 28b, 28c and 28d. Management engine 30a and 30b may be located remotely from backplane 12 or disposed on backplane 12 as shown in the embodiment of FIG. 1. Management engines 30a and 30b may be a SCSI controller, a RAID controller, a dual output controller, or any other appropriate type of controller.

Terminations 22a, 22b and 24 may either be a single-loop termination or a multi-loop termination. In the embodiment shown in FIG. 1, terminations 22a and 22b are multi-loop terminations and termination 24 is a single-loop termination. Terminations 22a and 22b are operable to create two bus lines with bus line 18a terminating at termination 22a and bus line 18b terminating at termination 22b. Termination 24, a single-loop termination, allows for buses 18a and 18b to form a single bus 18 that terminates at termination 24. Although FIG. 1 shows only two multi-loop terminations for two bus routes, alternative embodiments may include more than two or less than two multi-loop terminations. Additionally, alternative embodiments may include more than one single-loop terminations.

When sense engine 26 detects more than one peripheral attachment 16a and 16b interfacing with both connectors 14a and 14b, sense engine 26 sets switch 20 to the open state, multi-loop terminations 22a and 22b to an active state, and single-loop termination 24 to the inactive state. In this configuration, buses 18a and 18b exist without any stubs and terminates at termination 22a and termination 22b respectively. There are no stubs along bus 18b because the inactive single-loop termination 24 has a very high impedance allowing a signal on bus 18b to travel from connector 14b to termination 22b without encountering any junctions or dead ends until it terminates at active termination 22b. Similarly, bus 18a does not have any stubs because the signal travels from connector 14a to termination 22a without encountering any dead ends or junctions until the signal encounters termination 22a.

Furthermore, if sense engine 26 detects only a single peripheral attachment 16a interfacing with connector 14a, then sense engine 26 sets switch 20 to the closed state, multi-loop terminations 22a and 22b to an inactive state, and single-loop termination 24 to the active state. In this configuration, there are no stubs on buses 18a and 18b because signals on buses 18a and 18b travel uninterrupted from connector 14a to single-loop termination 24. The single bus route begins with bus 18a running until it hits switch 20. Since multi-loop termination 22a is inactive and has a very high impedance on the bus, there is no deviation in the bus route. Closed switch 20 directly connects buses 18a and 18b. Bus 18b runs uninterrupted past inactive multi-loop termination 22b until it encounters active single-loop termination 24. In this configuration, a signal travelling along buses 18a and 18b would not encounter any errant pathways or unnecessary dead ends.

FIG. 2 illustrates a block diagram of a method of dynamically configuring backplane 12. The method begins at step 70. The method proceeds to step 72 where sense engine 26 detects if peripheral attachments 16a and 16b interface with connectors 14a and 14b. Although this example is with respect to two connectors 14a and 14b, in alternative embodiments this method may include sensing and determining more than two connectors. Sense engine 26 may detect peripheral attachments 16a and 16b by using sense lines as described above. Sense engine 26 sends signals along the sense line to connectors 14a and 14b to detect if connectors 14a and 14b are interfacing with peripheral attachments 16a and 16b.

Based on detection information at step 72, sense engine 26 determines if there is one or more than one peripheral attachment 16a and 16b at step 74. If sense engine 26 detects that connector 14a interfaces with peripheral attachment 16a and connector 14b does not interface with peripheral attachment 16b, then sense engine 26 determines that there is one connector attached. This is a single loop, and the method proceeds to step 80. If sense engine 26 detects that connector 14a interfaces with peripheral attachment 16a and that connector 14b interfaces with peripheral attachments 16b, then sense engine 26 determines that there are more than one peripheral attachments 16. This is a multi-loop configuration, and the method proceeds to step 86.

At step 80, sense engine 26 determines a switch state for switch 20. Switch 20 may include an open and closed state. In the open state, switch 20 disconnects buses 18a and 18b. The closed state of switch 20 bridges together buses 18a and 18b. In the closed state, a signal travels uninterrupted between buses 18a and 18b and through switch 20. In the embodiment represented in FIG. 1, a two bus embodiment, at step 80 there is only one peripheral attachment 16a. In this embodiment sense engine 26 determines a closed switch state for switch 20 in order to allow peripheral attachment 16 to utilize all of the resources on buses 18a and 18b.

At step 82, sense engine 26 determines the states for terminations 22a, 22b and 24. Terminations 22a, 22b, and 24 have an active state and an inactive state. In the active state, termination 22a, 22b, and 24 present the proper impedance on the bus signal in order to terminate the signal with a reflection. In the inactive state, terminations 22a, 22b, and 24 present a very high impedance having no effect on the signal which allows the signal to continue along the bus route. With only one peripheral attachment 16a detected, sense engine 26 selects the inactive state for terminations 22a and 22b and the active state for termination 24. By inactivating terminations 22a and 22b, peripheral attachment 16a can fully utilize the resources on buses 18a and 18b and creates a single loop. Activating termination 24 creates a termination point for the combined bus 18a and bus 18b and allows peripheral attachment 16a to fully utilize the resources on bus 18a and 18b.

After the switch state and termination states have been decided, sense engine 26 alters the switch state of switch 20 and the termination states of terminations 22a, 22b, and 24 at step 84. This configuration allows bus 18a and 18b to function as a single bus route. A signal travels along bus 18a unimpeded past inactive termination 22a, through closed switch 20, past inactive termination 22b, and unobstructed along bus 18b until the signal terminates at active termination 24. After step 84, the method returns to step 72 where sense engine 26 continuously detects peripheral attachment to connectors 14a and 14b and alters the configuration of buses 18 as described above.

If at step 74 sense engine 26 determines more than one peripheral attachments 16 interfacing with connectors 14, 16a interfacing with connector 14a and peripheral attachment 16b interfacing with connector 14b, the method proceeds to step 86. At step 86, sense engine 26 determines the switch state for switch 20. In a two bus embodiment (as represented in FIG. 1) there are more than one peripheral attachments 16*a* and 16*b* interfacing with connectors 14*a* and 14*b*. In this embodiment sense engine 26 determines an open switch state for switch 20. In an open switch state, switch 20 disconnects bus 18*a* and 18*b*. The open switch state allows peripheral attachment 16*a* to use bus 18*a* and its resources and also allows peripheral attachment 16*b* to use bus 18*b* and its resources.

After detecting the switch state, at step 88 sense engine 26 determines a state for terminations 22*a*, 22*b*, and 24. Based on more than one peripheral attachment, sense engine 26 determines an active state for terminations 22*a* and 22*b* and an inactive state for termination 24. By activating terminations 22*a* and 22*b*, buses 18*a* and 18*b* end at termination points 22*a* and 22*b* respectively. Peripheral attachment 16*a* can fully use the resources on bus 18*a* and peripheral attachment 16*b* can fully use the resources on 18*b*. By inactivating termination 24, bus 18*b* can reach slots 28*c* and 28*d* from peripheral attachment 16*b*. The bus is properly terminated at the far end by termination 22*b*. Termination 24 presents a very high impedance and has no effect on the signal. Therefore, this configuration allows the most efficient use of both buses 18*a* and 18*b* and the resources on buses 18*a* and 18*b*.

At step 90, the sense engine alters the switch state and the termination states based on the determined states at steps 86 and 88. Accordingly, sense engine 26 alters the switch state for switch 20 to the open state, activates terminations 22*a* and 22*b*, and inactivates termination 24. In this configuration, buses 18*a* and 18*b* run separately and end respectively at terminations 22*a* and 22*b*. Bus 18*b* runs unobstructed past termination 24, which has a very high impedance on the bus. Following step 90, the method returns to step 72 and repeats step 74 through step 90 as described above.

In one configuration, the method has multi-loop terminations comprising terminations 22*a* and 22*b* and a single loop termination comprising termination 24. Sense engine 26, as in step 90, alters the switch state to an open state, the termination state for a plurality of multi-loop terminations 22 to an active state, and the termination state for a single-loop termination 24 to an inactive state when more than one peripheral attachments interface with the connectors. This configuration results in two separate bus routes that do not have significant stubs. In an alternative embodiment, more than two separate bus routes are created.

In another configuration, sense engine 26, as in step 84, alters the switch state to a closed state, the termination state for multi-loop terminations 22*a* and 22*b* to an inactive state, and the termination state for a single-loop termination 24 to an active state when one peripheral attachment interfaces with one of the connectors. This configuration creates a single bus route that does not have significant stubs.

Although the disclosed embodiments have been described in detail, it should be understood that various changes, substitutions and alterations can be made to the embodiments without departing from their spirit and scope.

What is claimed is:

1. An information handling system comprising:
   a backplane;
   a plurality of connectors associated with the backplane, the connectors operable to interface with one or more peripheral attachments;
   at least one switch associated with the connectors, the switch including an open state and a closed state;
   a plurality of terminations associated with the switch, the terminations including an active state and an inactive state;
   at least one sense engine associated with the connectors, the switch, and the terminations, the sense engine operable to detect peripheral attachment to the connectors and based on the peripheral attachment determine the state for the switch and the state for the terminations;
   wherein the terminations include a plurality of multi-loop terminations and at least one single-loop termination; and
   wherein the sense engine is operable to set the switch to the open state, the multi-loop terminations to the active state, and the single-loop termination to the inactive state upon detecting the connectors interfacing with more than one peripheral attachment.

2. The information handling system of claim 1 further comprising one or more slots associated with the connectors, the slots operable to interface with one or more devices.

3. The information handling system of claim 2 further comprising one or more management engines associated with the connectors, the one or more management engines operable to control the devices interfaced with the slots.

4. The information handling system of claim 1 wherein the sense engine is operable to set the switch to the closed state, the multi-loop terminations to the inactive state, and the single-loop termination to the active state upon detecting one peripheral attachment interfacing with one connector.

5. The information handling system of claim 1 further comprising the connectors located on a same edge of the backplane.

6. A method for dynamically configuring a backplane, the method comprising:
   detecting a peripheral attachment for a plurality of connectors;
   determining a switch state for at least one switch;
   determining a termination state for each of a plurality of terminations;
   altering the switch state and the termination states based on the peripheral attachment to the connectors; and
   setting the switch state to an open state, the termination state for a plurality of multi-loop terminations to an active state, and the termination state for a single-loop termination to an inactive state when more than one peripheral attachments interface with the connectors.

7. The method of claim 6 wherein detecting the peripheral attachment for a plurality of connectors comprises determining if more than one peripheral attachments interface with the connectors.

8. The method of claim 6 wherein detecting the peripheral attachment for a plurality of connectors comprises determining if one peripheral attachment interfaces with one of the connectors.

9. The method of claim 6 wherein altering the switch state comprises altering the switch state between an open state and a closed state.

10. The method of claim 6 wherein altering the termination states comprises altering the termination states between an active state and an inactive state.

11. The method of claim 6 further comprising setting the switch state to a closed state, the termination state for a plurality of multi-loop terminations to an inactive state, and the termination state for a single-loop termination to an active state when one peripheral attachments interfaces with one of the connectors.

12. A dynamically configurable backplane comprising:
a plurality of connectors associated with the backplane, the connectors operable to interface with one or more peripheral attachments;
one or more slots associated with the connectors, the slots operable to interface with one or more devices;
at least one switch associated with the connectors, the switch including an open state and a closed state;
a plurality of multi-loop terminations associated with the switch, the multi-loop terminations including an active state and an inactive state;
at least one single-loop terminations associated with the switch, the at least one single-loop terminations including an active state and an inactive state; and
at least one sense engine associated with the connectors, the switch, and the terminations, the sense engine operable to detect peripheral attachment to the connectors and determine the state for the switch and the state for the terminations based on the peripheral attachment, wherein the sense engine is operable to set the switch to the open state, the multi-loop terminations to the active state, and the single-loop termination to the inactive state when the connectors interface with more than one peripheral attachments.

13. The backplane of claim 12 further comprising the connectors located on a same edge of the backplane.

14. The backplane of claim 12 wherein the sense engine is operable to set the switch to the closed state, the multi-loop terminations to the inactive state, and the single-loop termination to the active state when one of the connectors interface with one peripheral attachment.

15. The backplane of claim 12 further comprising one or more management engines associated with the connectors, the management engines operable to control the devices in the slots.

16. The backplane of claim 15 wherein:
the management engine comprises a RAID controller; and
the devices comprise a plurality of hard disk drives.

* * * * *